United States Patent
Wu et al.

(10) Patent No.: US 11,245,454 B2
(45) Date of Patent: Feb. 8, 2022

(54) EXPLICIT CHANNEL STATE INFORMATION (CSI) WITH SPATIAL AND TIME DOMAIN COMPRESSION

(71) Applicant: QUALCOMM Incorporated, San Diego, CA (US)

(72) Inventors: Liangming Wu, Beijing (CN); Yu Zhang, Beijing (CN); Chenxi Hao, Beijing (CN); Qiaoyu Li, Beijing (CN); Hao Xu, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/972,425

(22) PCT Filed: Jun. 13, 2019

(86) PCT No.: PCT/CN2019/091035
§ 371 (c)(1),
(2) Date: Dec. 4, 2020

(87) PCT Pub. No.: WO2019/238083
PCT Pub. Date: Dec. 19, 2019

(65) Prior Publication Data
US 2021/0234587 A1    Jul. 29, 2021

(51) Int. Cl.
*H04B 7/06* (2006.01)
*H04L 25/02* (2006.01)

(52) U.S. Cl.
CPC .......... *H04B 7/063* (2013.01); *H04B 7/0617* (2013.01); *H04L 25/0204* (2013.01); *H04L 25/0216* (2013.01)

(58) Field of Classification Search
CPC ........................................................ H04B 7/063
USPC ........................................................ 375/267
See application file for complete search history.

(56) References Cited

U.S. PATENT DOCUMENTS

| | | | |
|---|---|---|---|
| 2006/0114816 A1* | 6/2006 | Maltsev | H04B 7/0417 370/210 |
| 2010/0099364 A1* | 4/2010 | Yang | H04B 7/0417 455/69 |
| 2017/0302109 A1* | 10/2017 | Lee | H02J 7/025 |
| 2018/0198511 A1* | 7/2018 | Maamari | H04B 7/0639 |
| 2019/0349036 A1* | 11/2019 | Wang | H04B 7/14 |
| 2020/0007185 A1* | 1/2020 | Li | H04L 27/38 |

FOREIGN PATENT DOCUMENTS

| CN | 103069759 A | 4/2013 |
|---|---|---|
| CN | 105099964 A | 11/2015 |
| CN | 107733485 A | 2/2018 |

(Continued)

OTHER PUBLICATIONS

International Search Report and Written Opinion—PCT/CN2018/091093—ISA/EPO—dated Feb. 27, 2019.

(Continued)

*Primary Examiner* — Lihong Yu
(74) *Attorney, Agent, or Firm* — QUALCOMM Incorporated

(57) ABSTRACT

Certain aspects of the present disclosure provide techniques for reporting explicit channel state information (CSI) with spatial and time domain compression.

30 Claims, 12 Drawing Sheets

(56) References Cited

FOREIGN PATENT DOCUMENTS

| WO | 2018028464 A1 | 2/2018 |
| WO | 2018083714 A1 | 5/2018 |

OTHER PUBLICATIONS

International Search Report and Written Opinion—PCT/CN2019/091035—ISA/EPO—dated Sep. 11, 2019.
Oualcomm Incorporated: "Maintenance for CSI Reporting", 3GPP TSG RAN WG1 Meeting #93, R1-1807340, May 25, 2018, 6 pages.
VIVO: "Remaining Issues on CSI Measurement", 3GPP TSG RAN WG1 Meeting #93, R1-1806042, May 25, 2018, 3 pages.

* cited by examiner

EXPLICIT CHANNEL STATE INFORMATION (CSI) WITH SPATIAL AND TIME DOMAIN COMPRESSION

INTRODUCTION

This application is a national stage application under 35 U.S.C. 371 of PCT/CN2019/091035, filed Jun. 13, 2019, which claims priority to International Application No. PCT/CN2018/091093, filed Jun. 13, 2018, both of which are hereby assigned to the assignee of the present application and hereby expressly incorporated by reference herein in their entireties.

FIELD OF THE DISCLOSURE

Aspects of the present disclosure relate to wireless communications, and more particularly, to techniques for reporting explicit channel state information (CSI) with spatial and time domain compression.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication performed by a UE. The method generally includes receiving one or more signals from a second wireless communications device over a plurality of layer and beam bases, wherein each of the plurality of bases is associated with a layer and a beam used for communications between the first wireless communications device and the second wireless communications device, determining a first subset of a plurality of taps based on a time domain representation of the one or more signals, each of the taps corresponding to a different time, the first subset of taps being associated with a first subset of the plurality of layer and beam bases, for each of the first subset of layer and beam bases, determining a corresponding second subset of taps of the first subset of taps, and transmitting information indicative of the first subset of taps and information indicative of each of the second subset of taps to the second wireless communications device.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
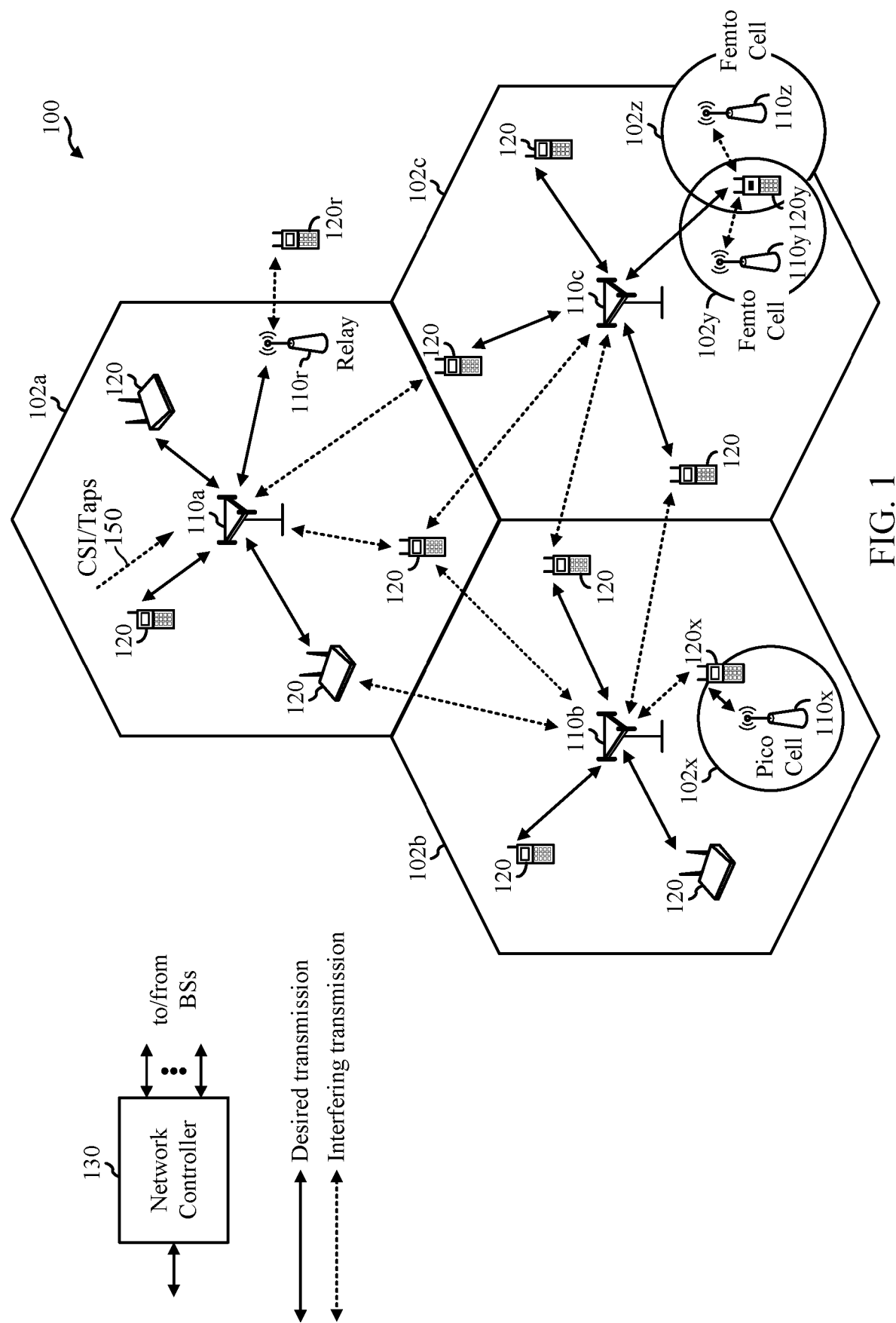
FIG. 1 is a block diagram conceptually illustrating an example telecommunications system, in accordance with certain aspects of the present disclosure.

Aspects of the present disclosure provide apparatus, methods, processing systems, and computer readable mediums for reporting feedback, for example, explicit channel state information (CSI) with spatial and time domain compression. As will be described in greater detail below, the feedback may indicate taps corresponding to a number of non-zero values. The information regarding these taps may represent CSI (e.g., for a single receive antenna and transmit beam (RX/TB) pair across one or more subbands. Each tap may be associated with an amplitude and phase of the reference signal at a given time of (delay associated with) the tap. The UE may report the tap information (e.g., tap location/index, amplitude, and phase for each tap associated with each RX/TB pair) to the BS as the CSI. For example, the BS may use the tap information to reconstruct the CSI and may also consider the tap information as decoder feedback (e.g., allowing the BS to strategically adjust encoding).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network, in which a UE 120 provides CSI feedback (e.g., tap information). As described in greater detail below with reference to FIGS. 7-12, the tap information may represent CSI (e.g., for a single receive antenna and transmit beam (RX/TB) pair across one or more subbands and may also may also be considered as decoder feedback.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
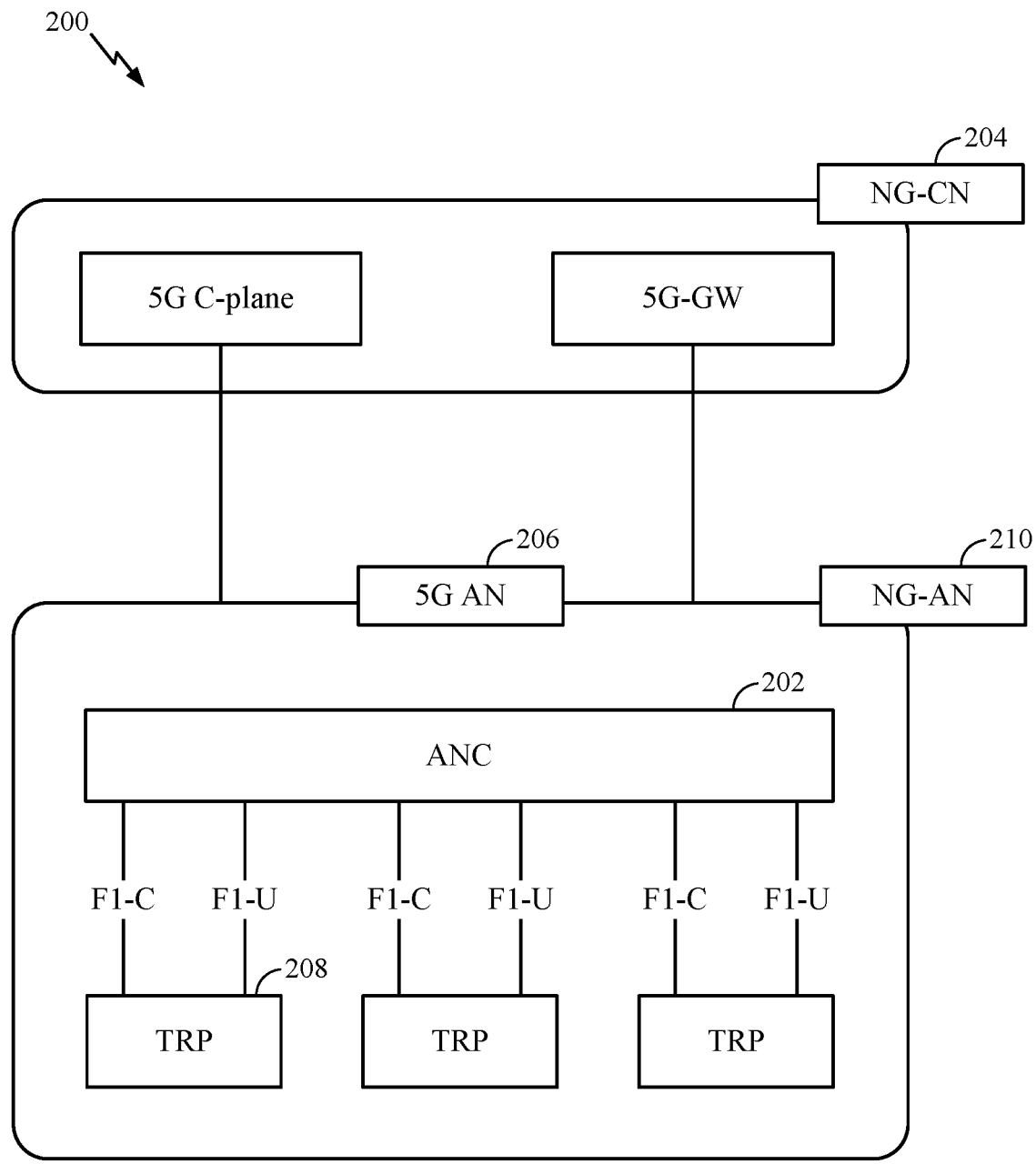
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
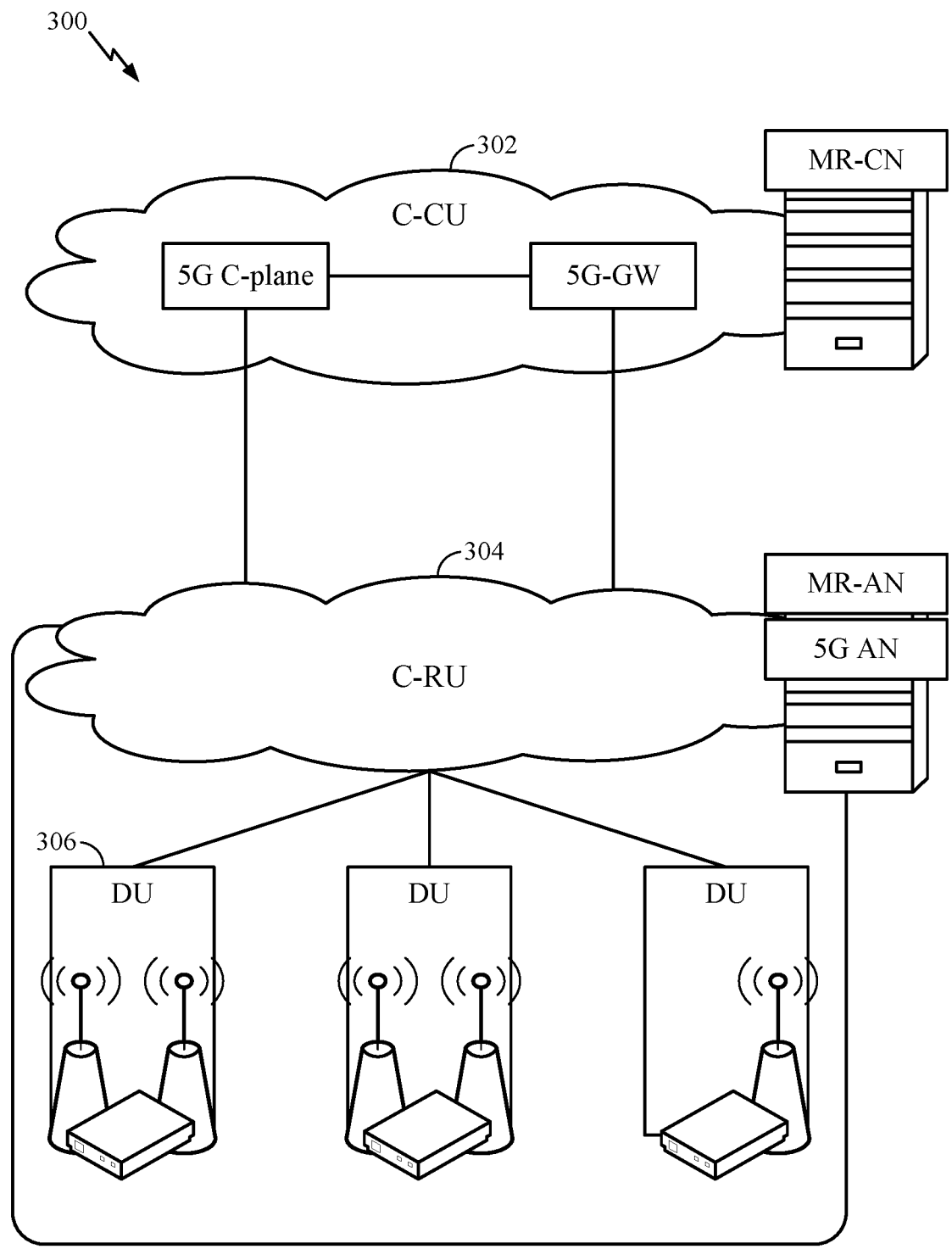
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
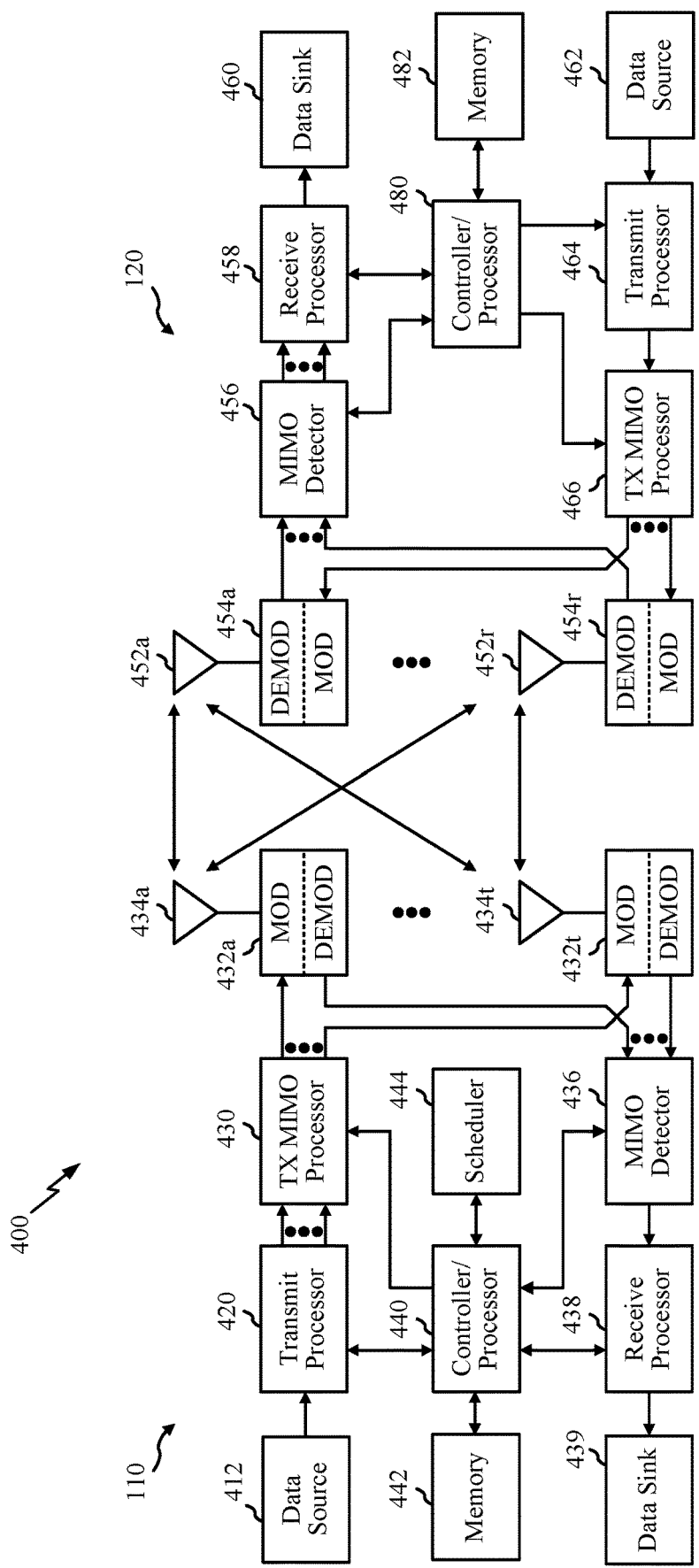
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
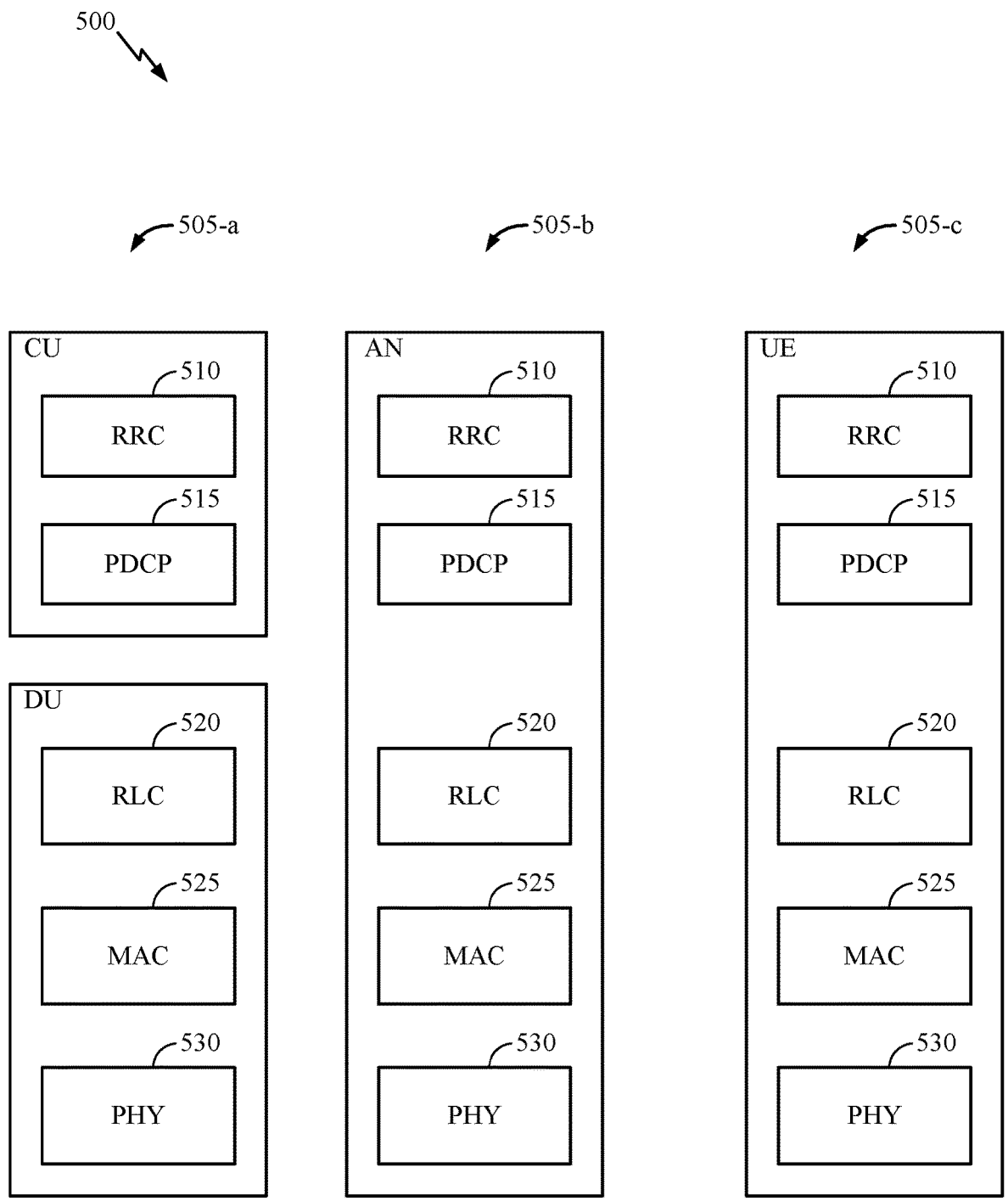
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
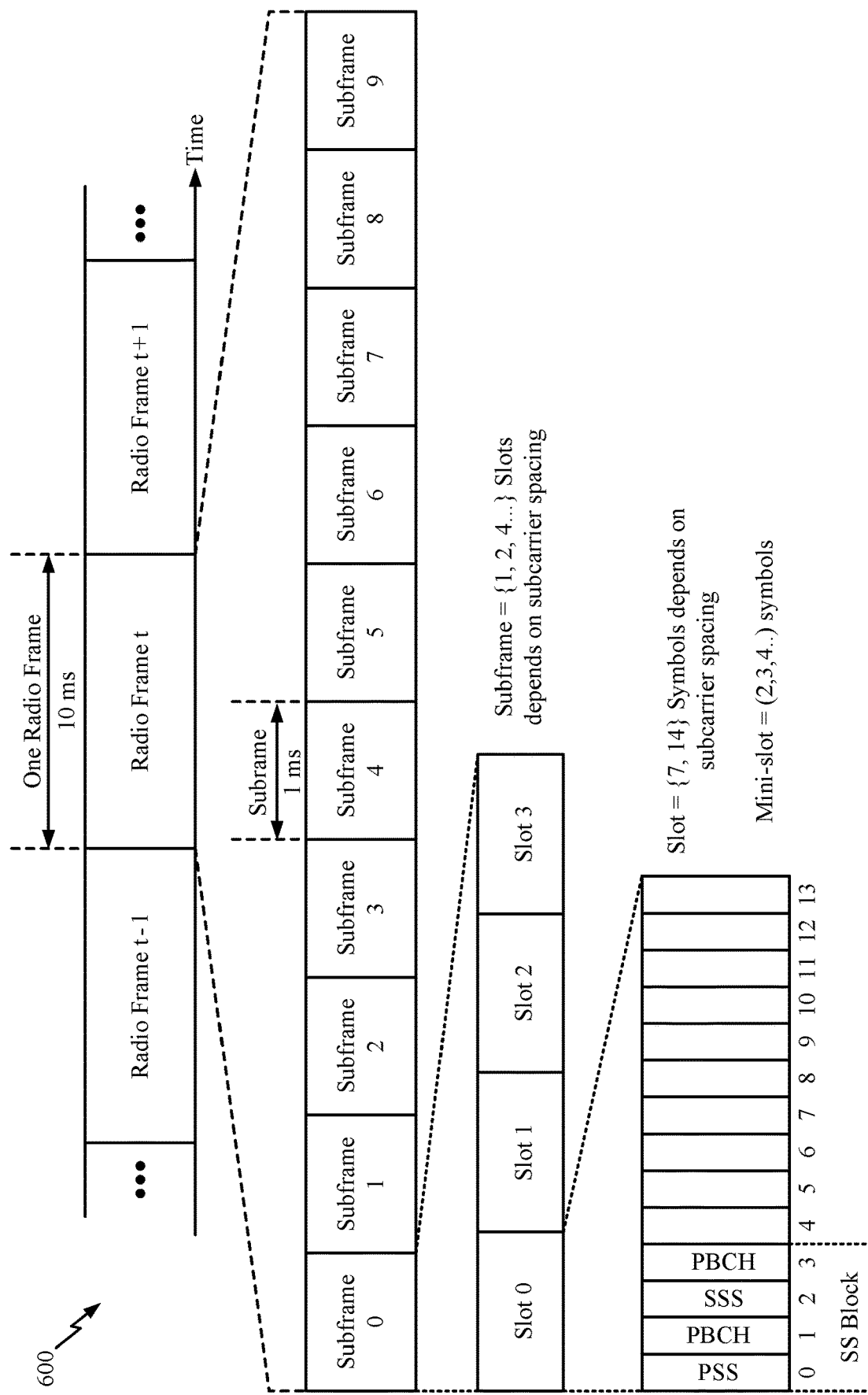
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched.

The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Explicit Channel State Information (CSI) with Spatial and Time Domain Compression As channel conditions between a user equipment (UE) and a base station (BS) change, it is important for the UE to report (e.g., periodically or aperiodically) feedback. For example, a UE may report, as feedback to the BS, certain indications (e.g., channel quality indicator (CQI), precoding matrix index (PMI), and rank indicator (RI)) that provide an indication of the latest channel conditions to the BS.

The BS then utilizes the received CSI report to improve communications with the UE. In certain aspects, such as under the NR-5G standards, CSI reporting with two types of spatial information feedback is supported. Type I CSI feedback generally refers to a CSI feedback scheme that is also used by wireless communications devices comporting to the LTE standards. Type I CSI feedback comprises codebook-based PMI feedback with normal spatial resolution.

Type II CSI feedback generally refers to an enhanced feedback scheme, enabling explicit feedback and/or codebook-based feedback with higher spatial resolution. For Type II CSI feedback, various categories (e.g., at least one of Categories 1, 2, and/or 3) may be used. Category 1 relates to reporting a precoder feedback based on a linear combination of dual-stage codebooks. Category 2 relates to providing explicit channel feedback, which may include channel feedback with a covariance matrix or frequency/time/spatial domain compressed channel. Category 3 relates to using a hybrid of Categories 1 and 2 for reporting the CSI. Compared to Category 1 CSI reporting, the Category 2 scheme provides a lower computation complexity.

Certain embodiments described herein relate to what may be considered explicit CSI reporting schemes with spatial and time domain compression that is suitable for Type II Category 2 CSI reporting. The schemes described herein may provide a great deal of flexibility in the type of information fed back, in an efficient manner in terms of signaling overhead.

Figure 7:
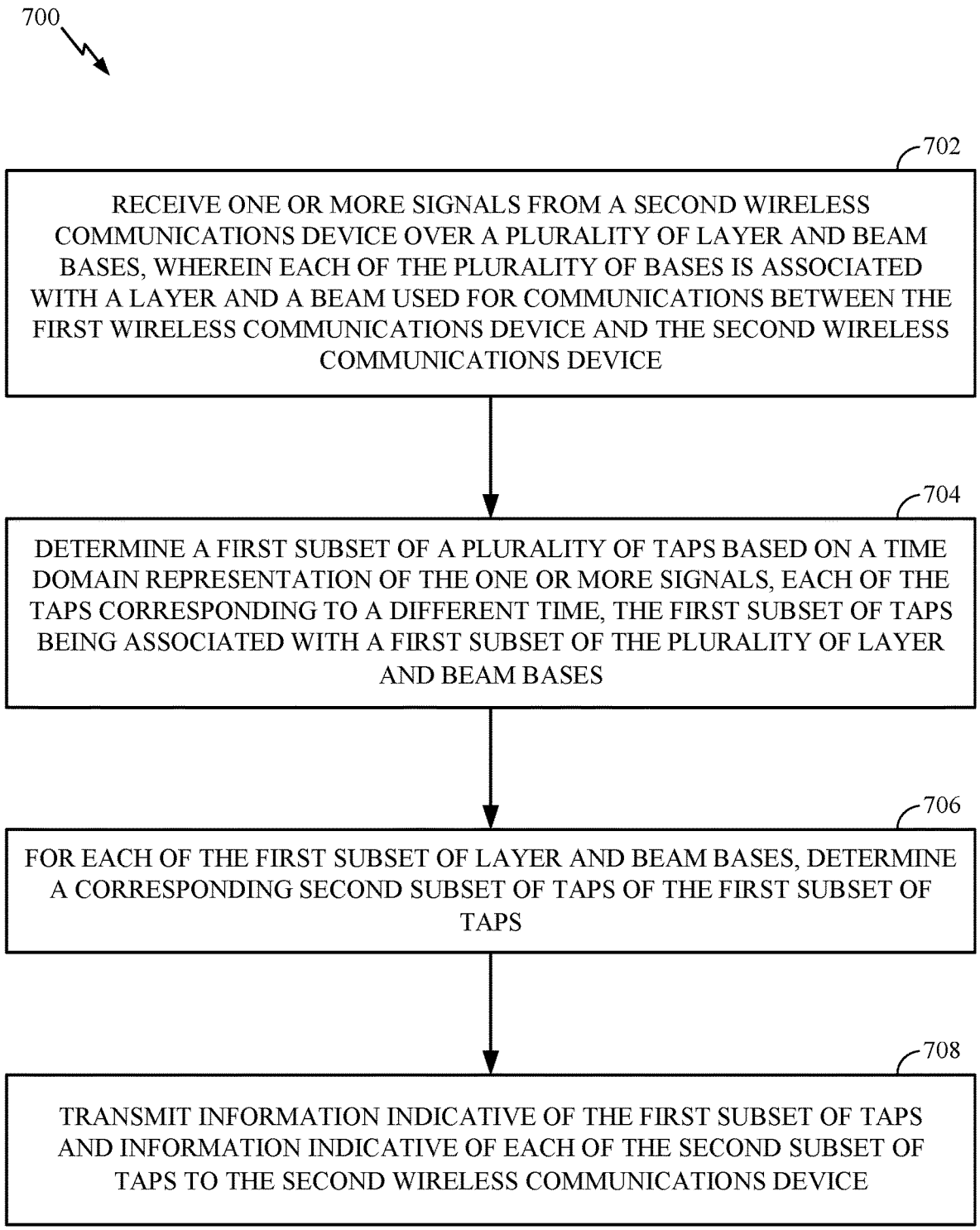
FIG. 7 illustrates example operations performed by a user equipment (UE), according to aspects of the present disclosure.

FIG. 7 illustrates example operations 700 performed by a first wireless communications device (e.g., a UE 120), according to aspects of the present disclosure. In some cases, operations 700 may be performed by one or more of the UE-side processors 458, 460, 464, and/or 480 shown in FIG. 4 and described above.

Operations 700 begin, at 702, by receiving one or more signals from a second wireless communication device via a plurality of layer and beam bases, wherein each of the plurality of bases is associated with a layer and beam used for communications between the first wireless communications device and the second wireless communications device. As will be described in greater detail below, each basis may be associated with a corresponding layer and beam. In some cases, each basis may be associated with a receive antenna and transmit beam pair.

At 704, the UE determines a first subset of taps of a plurality of taps based on a time domain representation of the one or more signals, each of the plurality of taps corresponding to a different time, the first subset of taps being associated with a first subset of the plurality of bases, the first subset of taps being less than all of the plurality of taps.

At 706, for each basis of the first subset of the plurality of bases, the UE determines a corresponding second subset of taps of (selected from) the first subset of taps, the second subset of taps being less than all of the first subset of taps.

At 708, the UE transmits information indicative of the first subset of taps and information indicative of each of the second subset of taps to the second wireless communication device.

Generally, to enable a UE to perform CSI reporting, a BS may transmit a reference signal (RS), such as channel state information RS (CSI-RS), from each of its transmit antennas over each subband of frequency band used for communication between the BS and the UE. A subband (size) may be at a particular granularity level, such as corresponding to a RB. The UE may then estimate and record a frequency response on each of its receive antennas based on the reference signal received from each of the transmit antennas over each subband of the frequency band.

This results in CSI that can be structured as a set of matrices (e.g., matrices 810 shown in FIG. 8 below). It should be noted that each transmit antenna and receive antenna may be a physical antenna, or a virtual antenna. A virtual antenna may be a group of one or more physical antennas that act as a single antenna.

Figure 8:
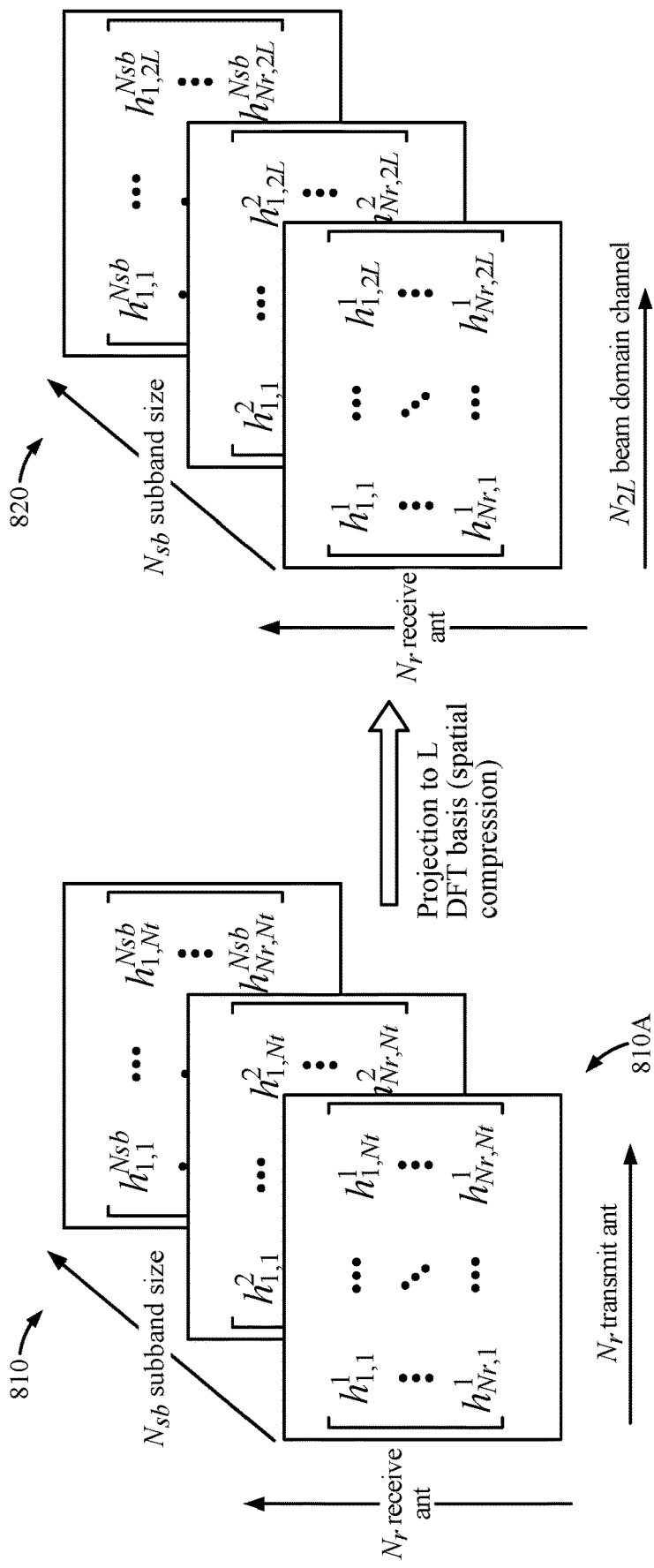
FIG. 8 illustrates an example set of matrices comprising CSI generated by a UE as a result of estimating and recording frequency responses of reference signals received at the UE's receive antennas from a BS's transmit antennas over various subbands, according to aspects of the present disclosure.

FIG. 8 shows an example set of matrices 810 comprising CSI generated by a UE (e.g., UE 120) as a result of estimating and recording frequency responses of reference signals received at the UE's receive antennas from the BS's (e.g., BS 110) transmit antennas over various subbands, as described above. As shown, the BS may comprise $N_t$ transmit antennas, corresponding to antennas 1-$N_t$, while the UE may comprise $N_r$ receive antennas, corresponding to antennas 1-$N_r$. Also, the BS may transmit reference signals over $N_{sb}$ subbands, corresponding to subbands $N_{sb}$.

Each matrix in the set of matrices 810 comprises frequency responses (denoted by $h_{Nr,Nt}^{Nsb}$) on receive antennas 1-$N_r$ based on reference signals transmitted by 1-$N_t$ transmit antennas over a single subband. For example, matrix 810A shows frequency responses on receive antennas 1-$N_r$ based on reference signals transmitted by 1-$N_t$ transmit antennas over subband 1 of subbands 1-$N_{sb}$. More specifically, for example, the first column of matrix 810A comprises frequency responses on receive antennas 1-$N_r$ based on a reference signal transmitted by transmit antenna $N_1$ of the BS over subband 1. Similarly, the last column of matrix 810A comprises frequency responses on receive antennas 1-$N_r$ based on a reference signal transmitted by transmit antenna $N_t$ of the BS over subband 1.

Although reporting matrices 810 to the BS may provide a comprehensive and accurate CSI, transmitting such a large amount of information to the BS may not be practical given that the feedback link capacity for providing CSI to the BS is generally limited. In certain aspects, in order to reduce the amount of CSI reported to the BS, the UE may perform a spatial compression of the frequency responses recorded in matrices 810.

In certain aspects, the UE and the BS, which may be millimeter wave cellular systems, engage in beamforming. Beamforming may refer to establishing a link between a BS and UE, wherein both of the devices form a beam corresponding to each other. For example, to communicate with a receive beam of the UE, the BS may form a transmit beam by combining transmit antennas $N_t$ in such a way that signals at particular angles experience constructive interference while others experience destructive interference. This results in a transmit beam that is concentrated or directed in a single direction. In aspects where the BS and the UE engage in beamforming, the UE may spatially compress the CSI in matrices 810 to matrices 820 that include frequency responses on receive antennas 1-$N_r$ based on reference signals transmitted through 2L transmit beams (corresponding to transmit beams 1-2L) over subbands 1-$N_{sb}$. In certain aspects, L may refer to the number of linear combination of beams and 2L may refer to the number of beam domain channels. In certain aspects, transmit beams may refer to any of the linear combination of beams, beam domain channels, etc.

As the number of possible transmit beams that the BS may use to communicate with the UE is less than the number of all the transmit antennas $N_t$ used by the BS (e.g., 2L<$N_t$), each of the matrices 820 includes a reduced amount of information in comparison to each of the matrices 810. To compress the CSI in matrices 810 to matrices 820, in certain aspects, the UE may use a projection to L Discrete Fourier Transform (DFT) basis (spatial compression).

In order to further reduce the amount of CSI payload that may be transmitted to the BS, the UE may perform a time domain compression of the frequency responses recorded for different layer and beam bases. Each basis may be associated with a corresponding layer and beam. In some cases, each basis may be associated with a receive antenna and transmit beam pair. In such cases, the UE may perform a time domain compression of the frequency responses recorded for different receive antenna (1-Nr) and transmit beam (1-2L) pairs (RX/TB pairs) over different subbands. Rather than the actual 'transmit beam,' a basis may be associated with the beam basis for linear combination. (thus, the term layer/beam basis). As such, the techniques presented herein may be applied to a variety of feedback techniques, such as precoder compression (e.g., to provide precoder feedback information in an efficient manner). To facilitate understanding, however, the description herein refers to various examples of receive antenna and transmit beam pairs as examples of one type of layer beam pair.

Figure 9:
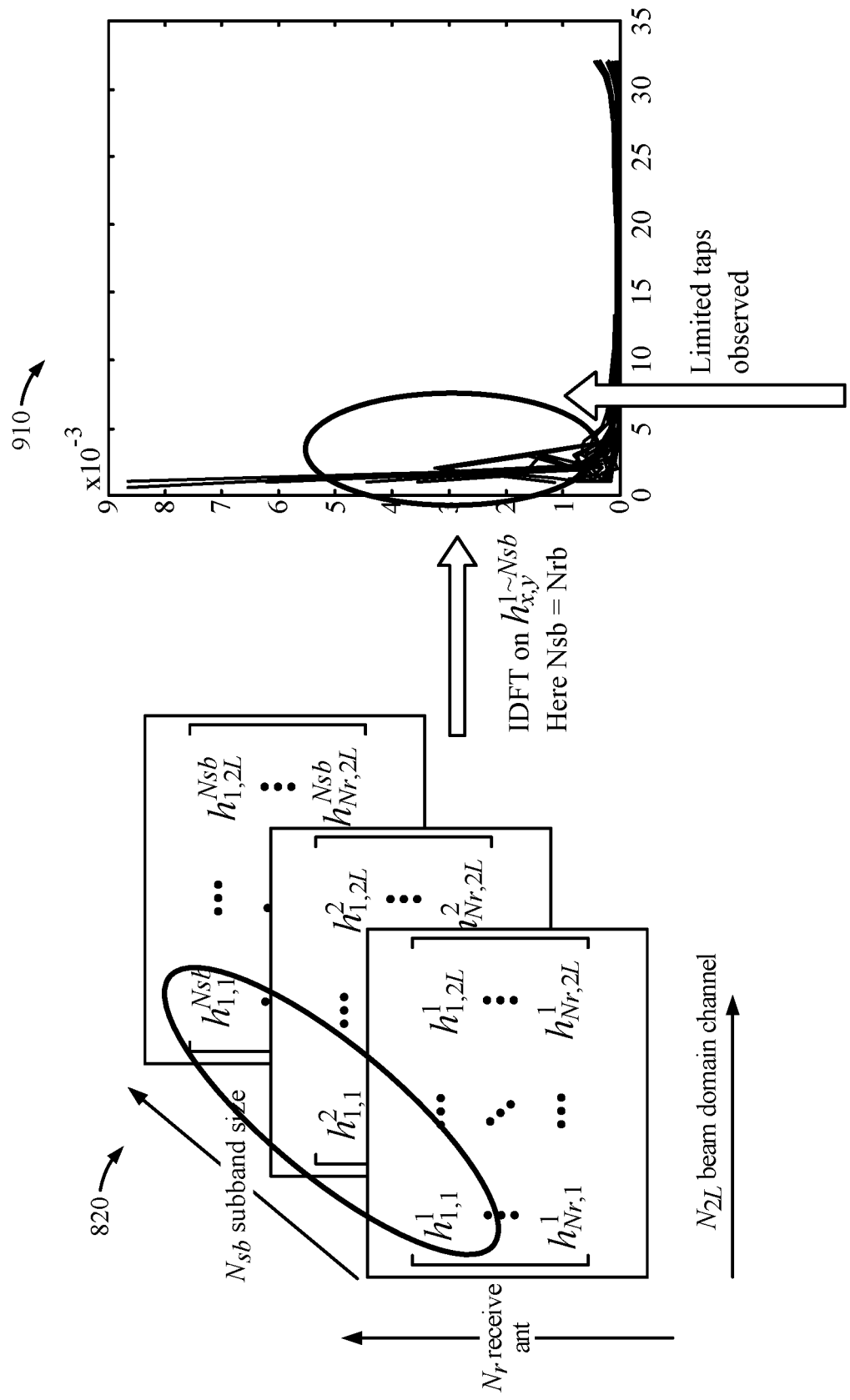
FIG. 9 illustrates a time domain representation of frequency responses of matrices of a receive antenna/transmit beam (RX/TB) pair, according to aspects of the present disclosure.

For example, FIG. 9 illustrates a time domain representation 910 of frequency responses of matrices 820 of a RX/TB pair (e.g., constructed by performing an inverse DFT (IDFT) on the frequency responses), which include frequency responses ($h_{1,1}^{1}$ to $h_{1,1}^{Nsb}$) for a single RX/TB pair (e.g., receive antenna 1 and transmit beam 1) over each of the subbands (1-Nsb). As shown, in time domain representation 910, there are a number of non-zero values (e.g., non-zero peak values) at different times. These different non-zero values may be due to the reference signal(s) on the subbands being received multiple times with different time delays due to the multi-path effect of the RX/TB pair channel. Accordingly, the time domain signal may be represented by a number of taps corresponding to the number of non-zero values. These taps represent the CSI for a single RX/TB pair across each of the subbands 1-Nsb.

Each tap may be associated with an amplitude and phase of the reference signal at the time of the tap. The UE may report the tap information (e.g., tap location/index, amplitude, and phase for each tap associated with each RX/TB pair) to the BS as the CSI (e.g., instead of or in addition to the frequency response information, such as matrices 820). For example, the BS may use the tap information to reconstruct the CSI. In certain aspects, a fewer number of bits can be transmitted to the BS when reporting CSI in the time domain as opposed to the frequency domain, thereby reducing bandwidth of the communication channel to report CSI and improving throughput of the wireless communication system.

In certain aspects, the time domain representation (i.e., tap information) of the CSI may be compressed (e.g., time domain compression performed) to further reduce the amount of information sent to the BS for reporting CSI, further improving throughput of the wireless communication system. For example, the tap information may be reported by the UE to the BS as a tap information matrix, denoted as $T_{r,b}$. In tap information matrix $T_{r,b}$, r represents a receiver antenna index (0≤r<Nr) and b represents the beam index (0≤b<2L). In certain aspects, each entry in the matrix $T_{r,b}$ indicates tap locations p associated with the receiver antenna at index r and the beam at index b. In certain aspects, p has a value 0≤p<P. In particular, in certain aspects, P corresponds to the maximum number of taps available at the UE, which may be configurable by the BS and/or associated with the assigned frequency bandwidth (e.g., if the assigned frequency bandwidth is 100 RB, with one CSI-RS resource per RB, then P=100 taps, each tap representing 1 RB, which would by the resolution of the time domain tap information).

As described above, of the P taps at the UE, for a given receiver antenna at index r and the beam at index b, only a subset of the P taps may be associated with (e.g., at the location of) non-zero values of the time domain representation of the CSI computed for receiver antenna at index r and the beam at index b. These taps associated with non-zero values may be referred to as active taps for the RX/TB pair. In certain aspects, the active taps may be those taps associated with values of the time domain representation of the CSI computed for receiver antenna at index r and the beam at index b that satisfy (e.g., are above) a threshold.

In certain aspects, the UE may be configured to only indicate tap information about one or more active taps of a RX/TB pair to the BS and not other taps in order to reduce overhead. For example, the UE may transmit in the tap information matrix, for each RX/TB pair, the location of the one or more active taps, and separately or as part of the tap information matrix, information associated with the one or more active taps (e.g., amplitude and phase).

In certain aspects, the location of each tap p of the maximum available number of taps P at the UE is represented by a value (e.g., bit or amplitude and/or phase) in the tap information matrix. For example, in certain aspects, each entry in matrix $T_{r,b}$ includes P values. The value associated with tap p in entry r,b indicates if the tap p is active or not for the RX/TB pair r,b. Accordingly, in certain aspects an active tap is indicated in the matrix $T_{r,b}$ by a non-zero value (e.g., $T_{r,b}(p_a) \ne 0$, where $p_a$ indicates a tap location of an active tap ("active tap location") per RX/TB pair). For all taps that are not included in the active tap locations $p_a$, matrix $T_{r,b}$ shows zero values (e.g., $T_{r,b}(\overline{p_a})=0$).

In certain aspects, the active tap locations $p_a$ may be shared between different RX/TB pairs. This further limits the tap information to be reported by the UE to the BS. In a first example, active tap locations may be the same for all RX/TB pairs. In such an example, a single set of index numbers of active tap locations may be reported for all RX/TB pairs, reducing the amount of information sent to indicate active tap location as compared to sending separate active tap locations for all of the RX/TB pairs.

In a second example, the active tap locations for each of the RX/TB pairs associated with a given transmit beam are the same, meaning all the receive antennas for a given transmit beam have the same active tap locations. In a third example, the active tap locations for each of the RX/TB pairs associated with a given receive antenna are the same, meaning all the transmit beams for a given receive antenna have the same active tap locations. In a fourth example, the RX/TB pairs may be divided in separate two or more groups. In such an example, the active tap locations for each of the RX/TB pairs may be the same within each group of pairs but different across the groups.

In order to report tap information about active taps in the second, third, and fourth examples, or where each RX/TB pair has different active tap locations, certain embodiments herein describe a multi-stage tap location indication scheme.

In certain aspects, in a first stage, the UE selects a subset $p_{a,1}$ of active tap locations from all possible tap locations P. The size of subset $p_{a,1}$ may be configurable or may be provided as an input by the UE.

In the second stage, the UE selects tap locations $p_a$ within the subset $p_{a,1}$. In certain aspects, the selected active tap locations $p_a$ within the subset $p_{a,1}$ (selected in the second stage) may be different for different receive antennas, although all transmit beams in the matrix may have the same selected active tap locations $p_a$. In other aspects, the selected active tap locations (selected in the second stage) may be different for different transmit beams, even if all receive antennas in the matrix may have the same selected active tap locations $p_a$. In other words, in the second stage, each beam may have tap numbers selected independently. In certain aspects, the selected active tap locations may be different for different RX/TB pairs or different groups of RX/TB pairs. In certain aspects, the number of active tap locations $p_a$ selected in the second stage may be configurable or reported to the BS by the UE.

In certain aspects, for each active tap $T_{r,b,p_a}$ (representing an active tap $p_a$ for RX/TB pair r,b), the amplitude and the phase of the active tap is quantized. For example, the amplitude and the phase may be quantized with 3 bits, or 2 bits for either amplitude or phase. In certain aspects, the level of quantization may be configurable. In certain aspects, if the amplitude is zero, no phase is reported for the active tap.

Figure 10:
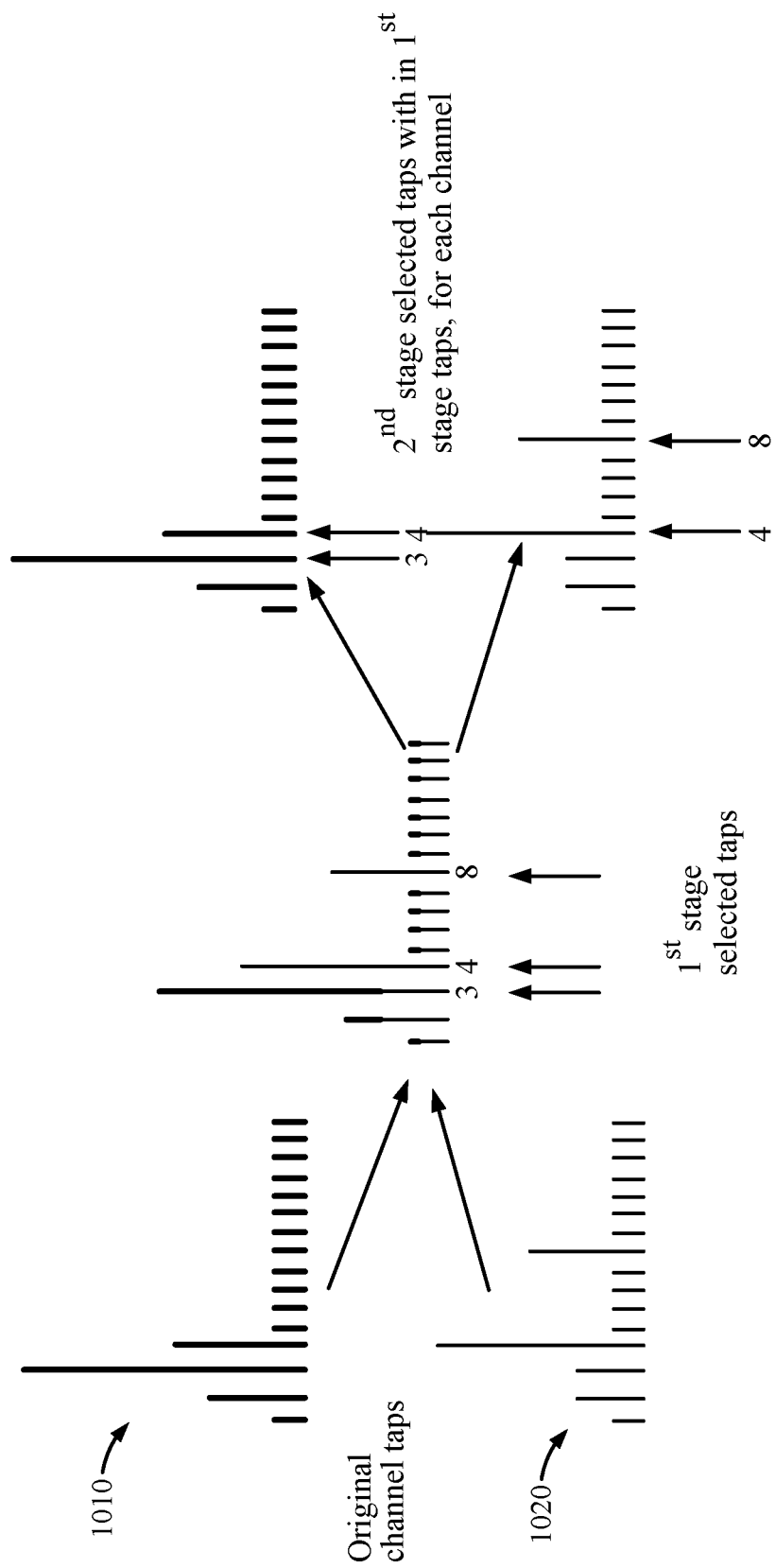
FIG. 10 illustrates an example of a multistage active tap selection for two different RX/TB pairs, according to aspects of the present disclosure.

FIG. 10 illustrates an example of a multistage active tap selection for two different RX/TB pairs 1010 and 1020. FIG. 10 shows each pair having P possible taps represented by vertical lines (e.g., 1-16), where P is 16. In the first stage of the multistage active tap selection, the UE may correlate the taps of pairs 1010 and 1020 together, and then identify a subset $p_{a,1}$ of active taps based on the magnitude of the taps. In the example shown, the size of subset $p_{a,1}$ is configured as 3. The identified active taps may be those having the highest magnitude from taps of pairs 1010 and 1020. As shown, tap locations 3, 4, and 8 are selected, which have the highest magnitude among all the 32 taps of the two pairs. Next, in the second stage a number of tap locations $p_a$ within the subset $p_{a,1}$ may be selected from the subset of 3, 4, and 8 for each one of pairs 1010 and 1020.

In the example shown, the number of active tap locations $p_a$ selected is configured as 2. For example, for pair 1010, tap locations 3 and 4 are selected because they have the highest magnitude among tap locations 3, 4, and 8 of pair 1010. Also, for pair 1020, taps 4 and 8 are selected because they have the highest magnitude among tap locations 3, 4, and 8 of pair 1020. In this manner, instead of using 16 bits to indicate active taps of all 16 possible taps for each pair, which may add up to 32 bits for pairs 1010 and 1020, the UE may use 16 bits to first indicate the selection of tap locations 3, 4, and 8, and then use three bits to indicate the selection of tap locations 3 and 4 for pair 1010 and three bits to indicate the selection of taps 4 and 8 for pair 1020. This adds up to 22 bits (i.e., 16+3+3), which is lower than 32 bits that would be reported had the multistage active tap selection scheme described in the embodiments above not been used.

In certain aspects, the number of active tap locations reported may be different for different RX/TB pairs. For example, for RX/TB pairs with lower average power received, a lower number of taps may be reported to reduce overhead while still providing sufficient CSI information. In certain aspects, RX/TB pairs may be separated/divided into two or more groups based on a desired number of active taps to report for each group. For example, in certain aspects, the RX/TB pairs may be divided into a first group with a subset $p_{a,1}$ or active tap selection $p_a$ of M taps and a second group with a subset $p_{a,1}$ or active tap selection $p_a$ of N taps, where M>N. In such aspects, the number of RX/TB pairs (or receive antennas, or transmit beams) within the first and/or the second group may be indicated via signaling from the BS to the UE.

The use of a first group and a second group is for illustration purposes, as additional groups (e.g., a third group, a fourth group and so on) may also be used in some cases. In certain aspects, the M and N indicated taps are directly indicative of the active taps $p_a$ for each of the pairs in the groups, respectively. In certain aspects, the multistage process described with respect to FIG. 10 can be applied to each of the groups separately, where M and N are indicative of the subset $p_{a,1}$ for each group, respectively, and the active taps $p_a$ are further individually indicated for each pair of the group.

In one example, RX/TB pairs may be divided into only two groups, where the first group has Q RX/TB pairs, and the second group includes the rest of RX/TB pairs. In such an example, if the total number of RX/TB pairs is $N_R N_b$, then up to $\lceil \log_2 C_{N_R N_b}^Q \rceil$ bits is needed to report the number of RX/TB pairs in the first group. In such an example, the number of RX/TB pairs in the second group may not be reported because it can be inferred by subtracting the total number of RX/TB pairs from Q.

In another example, if the number active tap locations is different for different transmit beams but that all the receive antennas share the same number of active tap locations, and the first group of beam pairs has Q beam pairs, and the second group of beam pairs includes the rest of the RX/TB pairs in of the total number of beam pairs, then up to $\lceil \log_2 C_{N_b}^Q \rceil$ bits is needed to report the number of beam pairs in the first group, where $N_b$ refers to the total number of beam pairs.

Figure 11:
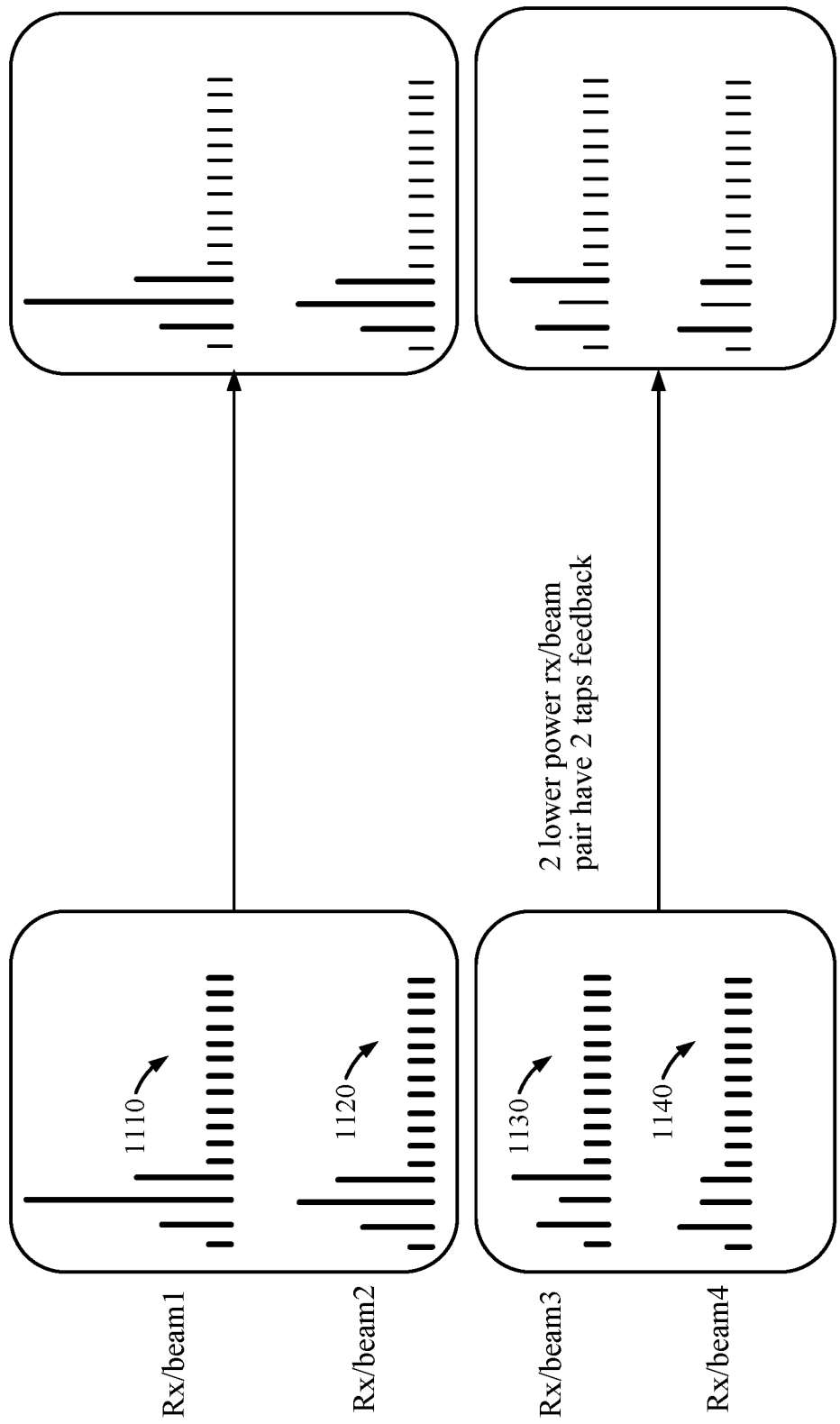
FIG. 11 illustrates an example grouping of four total RX/TB pairs, according to aspects of the present disclosure.

FIG. 11 illustrates an example grouping of four total RX/TB pairs 1110-1140. As shown, RX/TB pairs 1110 and 1120 may be grouped together, where they each have three active tap locations $p_a$. On the other hand, two lower power RX/TB pairs 1130 and 1140 may be grouped together, where they each have two active tap locations $p_a$. Accordingly, in certain aspects, instead of 16 bits being used to indicate the active tap locations for each of pairs 1110-1140 resulting in 64 bits being transmitted from the UE to the BS, 16 bits are used to indicate the active tap locations of pairs 1110-1120 and 16 bits are used to indicate the active tap locations of pairs 1130-1140 resulting in 32 bits being transmitted from the UE to the BS. It should be noted that additional bits than the 32 bits are transmitted to indicate the groupings as discussed, but the total number of bits sent may still be reduced.

Certain aspects describe a multistage active tap selection using grouping to further reduce the overhead associated with reporting tap information about active taps for each RX/TB pair. For example, such a scheme may be a combination of the techniques described with respect to FIGS. 10 and 11.

In certain aspects, in a first stage, the UE may explore the correlation of active taps between a number of receive antennas and transmit beams to select M tap locations (referred to as a starting subset of taps/tap locations) within $N_{RB}$ tap locations, where $N_{RB}$ refers to the total number of tap locations P. For example, the UE may correlate the values of the time-domain representation of the CSI across all of the RX/TB pairs and select M taps that have a highest magnitude (e.g., are above a threshold). M may be configurable or selected based on the correlation/magnitude of CSI at the tap locations.

In a second stage, the UE may separate the RX/TB pairs into groups (e.g., two groups $N_{b,1}$ and $N_{b,2}$). For example, the UE may separate all the beams (or alternatively separate all the receive antennas, or group in another manner), denoted by $N_b$ (e.g., 2L), into groups (e.g., two groups $N_{b,1}$ and $N_{b,2}$), and each group includes RX/TB pairs associated with the beams in the group. The groups $N_{b,1}$ and $N_{b,2}$ may be configured to select $M_1$ taps and $M_2$ taps, respectively, at the second stage. In certain aspects, $M_1$ is greater than $M_2$. For example, $M_1$ can be used to quantize beams with larger power or multipath beams. In certain aspects, $M>M_1>M_2$. Accordingly, in certain aspects, tap information about a fewer number of taps may be reported for beams with less power or importance.

In a third stage, the UE may select a number $M_1$ and $M_2$ of active taps from M candidate taps for each of $N_{b,1}$ and $N_{b,2}$, respectively. As such the overhead associated with reporting tap information relating to active taps of $N_{b,1}$ and $N_{b,2}$ may equal $\lceil \log_2 C_{N_{RB}}^M \rceil + \lceil \log_2 C_{N_b}^{N_{b,1}} \rceil + N_{b,1} \lceil \log_2 C_M^{M_1} \rceil + N_{b,2} \lceil \log_2 C_M^{M_2} \rceil$.

Figure 12:
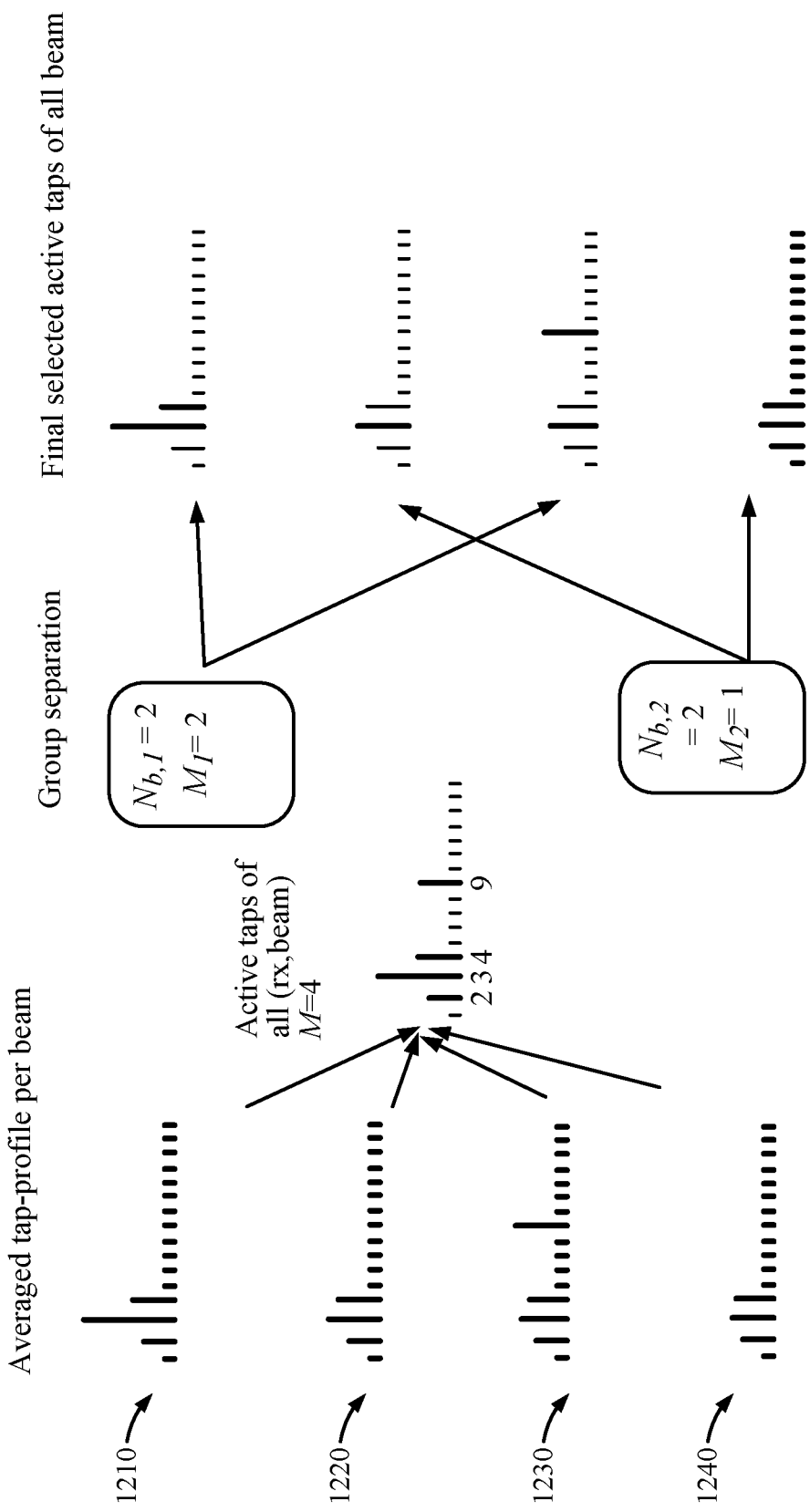
FIG. 12 illustrates an example grouping of active tap locations associated with four different beams, according to aspects of the present disclosure.

FIG. 12 illustrates an example grouping of active tap locations associated with four different beams. As described above, in the first stage, the UE may explore the correlation of active taps between a number of receive antennas and transmit beams. In the example of FIG. 12 the UE selects 4 taps (M=4) in tap locations 2, 3, 4, and 9 from a total of 16 taps. In the second stage, the UE may separate all the beams, into two groups of $N_{b,1}$ and $N_{b,2}$, where $N_{b,1}$ comprises $M_1$ taps ($M_1$=2) and $N_{b,2}$ comprises $M_2$ taps ($M_2$=1). Accordingly, in certain aspects, instead of 16 bits being used to indicate the active tap locations for each of pairs 1210-1240 resulting in 64 bits being transmitted from the UE to the BS, 16 bits are used to indicate M, 2 bits are used to indicate $M_1$ for each pair, and 1 bit is used to indicate $M_2$ for each pair resulting in 22 bits (16+2*2+1*2) being transmitted from the UE to the BS. It should be noted that additional bits than the 22 bits are transmitted to indicate the groupings as discussed, but the total number of bits sent may still be reduced.

In the embodiments described herein, once a number of active tap locations are selected for each RX/TB pair, in addition to indicating the active tap locations for each RX/TB pair to the BS, the UE may also transmit information indicative of the amplitudes and phases of the taps corresponding to the selected active tap locations to the BS for each of the RX/TB pairs.

For example, in certain aspects, the UE may transmit a two-part encoding structure (e.g., as part of PMI reporting on PUSCH) for CSI reporting where the first part of the two-part structure may report the number of receive antennas, the number of taps in the first subset of taps selected in the first stage of the embodiments described above (e.g., M, subset $p_{a,1}$), and/or the number of taps in the second subset of taps selected in the second stage of the embodiments described above (e.g., M1, M2, $p_a$). In certain aspects, the first part of the encoding structure may also explicitly report the number of payload bits included in the second part of the structure, with a range of the minimum to the largest hypothesis of the payload size. In certain aspects, the first part of the encoding structure may also report the non-zero amplitude taps per beam group.

In certain aspects, the second part of the two-part encoding structure may report one or more of beam-associated information for the transmit beams used for spatial compression (e.g., 2L beams), tap locations of each of the first subset of active taps selected in the first stage of the embodiments described above (e.g., M, subset $p_{a,1}$), information indicative of each of the second subset of taps selected in the second stage of the embodiments described above (e.g., M1, M2, $p_a$), and/or information indicative of an amplitude and phase associated with each of the corresponding second subset of taps.

In certain aspects, information included in the second part of the encoding structure may be prioritized. This is to ensure that CSI with higher importance is prioritized over less important CSI. For example, in certain aspects described above, the total number of transmit beams may be divided into multiple groups. In such aspects, the second part of the encoding structure may first prioritize tap information about the first group, which may include higher power beams, over the other groups. Next, the second part of the encoding structure may prioritize the rest of the groups similarly (e.g., second group, third group . . . etc.). The second part of the encoding structure may also prioritize information within each group. For example, the UE may first start with including tap information (active tap locations as well as the corresponding amplitude and phase) about the first beam within the first group of beams and then move to the second beam, . . . , and finally the L-th beam. Next, the UE includes tap information about the first beam within the second group of beams and then moves to the second beam, . . . , and finally the L-th beam of the second group of beams and so on.

In certain aspects, if the CSI associated with the second part of the encoding structure exceeds the maximum allowed payload, certain parts of the payload may be omitted. For example, in certain aspects, the omitting may be based on the priority groups. In such an example, if adding bits from the lower priority beam groups (e.g., group 2) to the total payload result in the total payload exceeding maximum payload, then the entire lower priority group is discarded.

In certain aspects, the omitting may be based on the sub-level priority group. For example, if adding lower priority tap information within the lower priority groups to the total payload results in the total payload exceeding maximum payload, then only the lower priority tap information within the lower priority groups may be omitted, not the entire lower priority group.

EXAMPLE EMBODIMENTS

Embodiment 1

A method of wireless communications by a first wireless communications device, comprising receiving one or more signals from a second wireless communications device over a plurality of layer and beam bases, wherein each of the plurality of bases is associated with a layer and a beam used for communications between the first wireless communications device and the second wireless communications device, determining a first subset of a plurality of taps based on a time domain representation of the one or more signals, each of the taps corresponding to a different time, the first subset of taps being associated with a first subset of the plurality of layer and beam bases, for each of the first subset of layer and beam bases, determining a corresponding second subset of taps of the first subset of taps, and transmitting information indicative of the first subset of taps and information indicative of each of the second subset of taps to the second wireless communications device.

Embodiment 2

The method of Embodiment 1, wherein each layer and beam basis is associated with a receive antenna of the first wireless communications device and a transmit beam of the second wireless communications device.

Embodiment 3

The method of any of Embodiments 1-2, wherein the second subset of taps can be different for layer and beam bases associated with a common layer and different transmit beams.

Embodiment 4

The method of any of Embodiments 1-3, further comprising determining a third subset of taps of the plurality of taps, the third subset of taps being associated with a second subset of the plurality of bases, wherein the first subset of bases does not share any basis with the second subset of bases, for each basis of the second subset of bases, determining a corresponding fourth subset of taps of the third subset of taps, and transmitting information indicative of the third subset of taps and information indicative of the fourth subset of taps to the second wireless communication device.

Embodiment 5

The method of Embodiment 4, further comprising for each basis of the second subset of bases, quantizing an amplitude and phase associated with each of the corresponding fourth subset of taps and transmitting information indicative of each of the quantized amplitudes and phases to the second wireless communication device.

Embodiment 6

The method of any of Embodiments 4-5, further comprising transmitting to the second wireless communications device information indicative of a number of the first subset of bases.

Embodiment 7

The method of any of Embodiments 4-6, further comprising determining a starting subset of taps of the plurality of taps, wherein the first subset of taps is determined from the starting subset, and wherein the third subset of taps is determined from the starting subset.

Embodiment 8

The method of any of Embodiments 1-7, wherein a number of the first subset of taps is at least one of: configurable or provided as input by the first wireless communications device.

Embodiment 9

The method of any of Embodiments 1-8, wherein a number of the plurality of taps is at least one of configurable by the second wireless communications device or based on a bandwidth assigned to the one or more signals.

Embodiment 10

The method of any of Embodiments 1-9, wherein, for each of the plurality of bases associated with a given transmit beam or each of the plurality of bases associated with a given receive antenna, the corresponding second subset of taps are the same.

Embodiment 11

The method of any of Embodiments 1-10, further comprising for each basis of the first subset of bases, quantizing an amplitude and phase associated with each of the corresponding second subset of taps and transmitting information indicative of each of the quantized amplitudes and phases to the second wireless communication device.

Embodiment 12

The method of any of Embodiments 1-11, wherein transmitting information indicative of the first subset of taps and information indicative of each of the second subset of taps to the second wireless communication device comprises reporting, in a first part of a two-part encoding structure for channel state information reporting, one or more of a number of a plurality of layers, a number of taps in the first subset of taps, and a number of taps in the second subset of taps and reporting, in a second part of the two-part encoding structure, one or more of beam associated information for a plurality of the beams, locations of each of the first subset of taps, the information indicative of each of the second subset of taps, and information indicative of an amplitude and phase associated with each of the corresponding second subset of taps.

Embodiment 13

The method of Embodiment 12, further comprising explicitly reporting in the first part a number of payload bits included in the second part.

Embodiment 14

The method of any of Embodiments 12-13, wherein the plurality of beams are divided into a plurality of groups, wherein beams within each of the groups are prioritized in a first order of priority, wherein the plurality of groups are prioritized in a second order of priority, and wherein bits for reporting information in the second part are assigned to report information related to each of the plurality of beams based on the first order of priority and the second order of priority.

Embodiment 15

An apparatus for wireless communications by a first wireless communications device, comprising means for receiving one or more signals from a second wireless communications device over a plurality of layer and beam bases, wherein each of the plurality of bases is associated with a layer and a beam used for communications between the first wireless communications device and the second wireless communications device, means for determining a first subset of a plurality of taps based on a time domain representation of the one or more signals, each of the taps corresponding to a different time, the first subset of taps being associated with a first subset of the plurality of layer and beam bases, means for determining a corresponding second subset of taps of the first subset of taps for each of the first subset of layer and beam bases, and means for transmitting information indicative of the first subset of taps and information indicative of each of the second subset of taps to the second wireless communications device.

Embodiment 16

The apparatus of Embodiment 15, wherein each layer and beam basis is associated with a receive antenna of the first wireless communications device and a transmit beam of the second wireless communications device.

Embodiment 17

The apparatus of any of Embodiments 15-16, wherein the second subset of taps can be different for layer and beam bases associated with a common layer and different transmit beams.

Embodiment 18

The apparatus of any of Embodiments 15-17, further comprising means for determining a third subset of taps of the plurality of taps, the third subset of taps being associated with a second subset of the plurality of bases, wherein the first subset of bases does not share any basis with the second subset of bases, means for determining, for each basis of the second subset of bases, a corresponding fourth subset of taps of the third subset of taps, and means for transmitting information indicative of the third subset of taps and information indicative of the fourth subset of taps to the second wireless communication device.

Embodiment 19

The apparatus of Embodiment 18, further comprising means for quantizing, for each basis of the second subset of bases, an amplitude and phase associated with each of the corresponding fourth subset of taps and means for transmitting information indicative of each of the quantized amplitudes and phases to the second wireless communication device.

Embodiment 20

The apparatus of any of Embodiments 15-19, further comprising means for transmitting to the second wireless communications device information indicative of a number of the first subset of bases.

Embodiment 21

The apparatus of any of Embodiments 15-20, further comprising means for determining a starting subset of taps of the plurality of taps, wherein the first subset of taps is determined from the starting subset, and wherein the third subset of taps is determined from the starting subset.

Embodiment 22

The apparatus of any of Embodiments 15-21, wherein a number of the first subset of taps is at least one of: configurable or provided as input by the first wireless communications device.

Embodiment 23

The apparatus of any of Embodiments 15-22, wherein a number of the plurality of taps is at least one of: configurable by the second wireless communications device or based on a bandwidth assigned to the one or more signals.

Embodiment 24

The apparatus of any of Embodiments 15-23, wherein, for each of the plurality of bases associated with a given transmit beam or each of the plurality of bases associated with a given receive antenna, the corresponding second subset of taps are the same.

Embodiment 25

The apparatus of any of Embodiments 15-24, further comprising means for quantizing, for each basis of the first subset of bases, an amplitude and phase associated with each of the corresponding second subset of taps and means for transmitting information indicative of each of the quantized amplitudes and phases to the second wireless communication device.

Embodiment 26

The apparatus of any of Embodiments 15-25, wherein means for transmitting information indicative of the first subset of taps and information indicative of each of the second subset of taps to the second wireless communication device comprises means for reporting, in a first part of a two-part encoding structure for channel state information reporting, one or more of a number of a plurality of layers, a number of taps in the first subset of taps, and a number of taps in the second subset of taps and means for reporting, in a second part of the two-part encoding structure, one or more of beam associated information for a plurality of the beams, locations of each of the first subset of taps, the information indicative of each of the second subset of taps, and information indicative of an amplitude and phase associated with each of the corresponding second subset of taps.

Embodiment 27

The apparatus of Embodiment 26, further comprising means for explicitly reporting in the first part a number of payload bits included in the second part.

Embodiment 28

The apparatus of any of Embodiments 26-27, wherein the plurality of beams are divided into a plurality of groups, wherein beams within each of the groups are prioritized in a first order of priority, wherein the plurality of groups are prioritized in a second order of priority, and wherein bits for reporting information in the second part are assigned to report information related to each of the plurality of beams based on the first order of priority and the second order of priority.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors (e.g., one or more of the various processors shown in FIG. 4 and described above) to perform the operations described herein. For example, instructions for performing the operations described herein and illustrated in FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a first wireless communications device, comprising:
    receiving one or more signals from a second wireless communications device over a plurality of layer and beam bases, wherein each of the plurality of bases is associated with a layer and a beam used for communications between the first wireless communications device and the second wireless communications device;

determining a first subset of a plurality of taps based on a time domain representation of the one or more signals, each of the taps corresponding to a different time, the first subset of taps being associated with a first subset of the plurality of layer and beam bases;

for each of the first subset of layer and beam bases, determining a corresponding second subset of taps of the first subset of taps; and transmitting information indicative of the first subset of taps and information indicative of each of the second subset of taps, comprising at least a location of the first subset of taps and the second subset of taps, to the second wireless communications device.

2. The method of claim 1, wherein each layer and beam basis is associated with a receive antenna of the first wireless communications device and a transmit beam of the second wireless communications device.

3. The method of claim 1, wherein the second subset of taps can be different for layer and beam bases associated with a common layer and different transmit beams.

4. The method of claim 1, further comprising:
determining a third subset of taps of the plurality of taps, the third subset of taps being associated with a second subset of the plurality of bases, wherein the first subset of bases does not share any basis with the second subset of bases;

for each basis of the second subset of bases, determining a corresponding fourth subset of taps of the third subset of taps; and transmitting information indicative of the third subset of taps and information indicative of the fourth subset of taps to the second wireless communication device.

5. The method of claim 4, further comprising:
for each basis of the second subset of bases, quantizing an amplitude and phase associated with each of the corresponding fourth subset of taps; and transmitting information indicative of each of the quantized amplitudes and phases to the second wireless communication device.

6. The method of claim 4, further comprising:
transmitting to the second wireless communications device information indicative of a number of the first subset of layer and beam bases.

7. The method of claim 4, further comprising:
determining a starting subset of taps of the plurality of taps, wherein the first subset of taps is determined from the starting subset, and wherein the third subset of taps is determined from the starting subset.

8. The method of claim 1, wherein a number of the first subset of taps is at least one of:
configurable; or
provided as input by the first wireless communications device.

9. The method of claim 1, wherein a number of the plurality of taps is at least one of:
configurable by the second wireless communications device; or
based on a bandwidth assigned to the one or more signals.

10. The method of claim 1, wherein, for each of the plurality of bases associated with a given transmit beam or each of the plurality of bases associated with a given receive antenna, the corresponding second subset of taps are the same.

11. The method of claim 1, further comprising:
for each basis of the first subset of bases, quantizing an amplitude and phase associated with each of the corresponding second subset of taps; and transmitting information indicative of each of the quantized amplitudes and phases to the second wireless communication device.

12. The method of claim 1, wherein transmitting information indicative of the first subset of taps and information indicative of each of the second subset of taps to the second wireless communication device comprises:
reporting, in a first part of a two-part encoding structure for channel state information reporting, one or more of a number of a plurality of layers, a number of taps in the first subset of taps, and a number of taps in the second subset of taps; and reporting, in a second part of the two-part encoding structure, one or more of beam associated information for a plurality of the beams, locations of each of the first subset of taps, the information indicative of each of the second subset of taps, and information indicative of an amplitude and phase associated with each of the corresponding second subset of taps.

13. The method of claim 12, further comprising explicitly reporting in the first part a number of payload bits included in the second part.

14. The method of claim 12, wherein the plurality of beams are divided into a plurality of groups, wherein beams within each of the groups are prioritized in a first order of priority, wherein the plurality of groups are prioritized in a second order of priority, and wherein bits for reporting information in the second part are assigned to report information related to each of the plurality of beams based on the first order of priority and the second order of priority.

15. An apparatus for wireless communications by a first wireless communications device, comprising:
means for receiving one or more signals from a second wireless communications device over a plurality of layer and beam bases, wherein each of the plurality of bases is associated with a layer and a beam used for communications between the first wireless communications device and the second wireless communications device;

means for determining a first subset of a plurality of taps based on a time domain representation of the one or more signals, each of the taps corresponding to a different time, the first subset of taps being associated with a first subset of the plurality of layer and beam bases;

means for determining a corresponding second subset of taps of the first subset of taps for each of the first subset of layer and beam bases; and means for transmitting information indicative of the first subset of taps and information indicative of each of the second subset of taps, comprising at least a location of the first subset of taps and the second subset of taps, to the second wireless communications device.

16. The apparatus of claim 15, wherein each layer and beam basis is associated with a receive antenna of the first wireless communications device and a transmit beam of the second wireless communications device.

17. The apparatus of claim 15, wherein the second subset of taps can be different for layer and beam bases associated with a common layer and different transmit beams.

18. The apparatus of claim 15, further comprising:
means for determining a third subset of taps of the plurality of taps, the third subset of taps being associated with a second subset of the plurality of bases, wherein the first subset of bases does not share any basis with the second subset of bases;

means for determining, for each basis of the second subset of bases, a corresponding fourth subset of taps of the third subset of taps; and means for transmitting information indicative of the third subset of taps and information indicative of the fourth subset of taps to the second wireless communication device.

19. The apparatus of claim 18, further comprising:

means for quantizing, for each basis of the second subset of bases, an amplitude and phase associated with each of the corresponding fourth subset of taps; and means for transmitting information indicative of each of the quantized amplitudes and phases to the second wireless communication device.

20. The apparatus of claim 18, further comprising:

means for transmitting to the second wireless communications device information indicative of a number of the first subset of bases.

21. The apparatus of claim 18, further comprising:

means for determining a starting subset of taps of the plurality of taps, wherein the first subset of taps is determined from the starting subset, and wherein the third subset of taps is determined from the starting subset.

22. The apparatus of claim 15, wherein a number of the first subset of taps is at least one of:

configurable; or provided as input by the first wireless communications device.

23. The apparatus of claim 15, wherein a number of the plurality of taps is at least one of:

configurable by the second wireless communications device; or based on a bandwidth assigned to the one or more signals.

24. The apparatus of claim 15, wherein, for each of the plurality of bases associated with a given transmit beam or each of the plurality of bases associated with a given receive antenna, the corresponding second subset of taps are the same.

25. The apparatus of claim 15, further comprising:

means for quantizing, for each basis of the first subset of bases, an amplitude and phase associated with each of the corresponding second subset of taps; and means for transmitting information indicative of each of the quantized amplitudes and phases to the second wireless communication device.

26. The apparatus of claim 15, wherein means for transmitting information indicative of the first subset of taps and information indicative of each of the second subset of taps to the second wireless communication device comprises:

means for reporting, in a first part of a two-part encoding structure for channel state information reporting, one or more of a number of a plurality of layers, a number of taps in the first subset of taps, and a number of taps in the second subset of taps; and means for reporting, in a second part of the two-part encoding structure, one or more of beam associated information for a plurality of the beams, locations of each of the first subset of taps, the information indicative of each of the second subset of taps, and information indicative of an amplitude and phase associated with each of the corresponding second subset of taps.

27. The apparatus of claim 26, further comprising means for explicitly reporting in the first part a number of payload bits included in the second part.

28. The apparatus of claim 26, wherein the plurality of beams are divided into a plurality of groups, wherein beams within each of the groups are prioritized in a first order of priority, wherein the plurality of groups are prioritized in a second order of priority, and wherein bits for reporting information in the second part are assigned to report information related to each of the plurality of beams based on the first order of priority and the second order of priority.

29. An apparatus of wireless communications by a first wireless communications device, comprising:

a receiver configured to receive one or more signals from a second wireless communications device over a plurality of layer and beam bases, wherein each of the plurality of bases is associated with a layer and a beam used for communications between the first wireless communications device and the second wireless communications device;

at least one processor configured to determine a first subset of a plurality of taps based on a time domain representation of the one or more signals, each of the taps corresponding to a different time, the first subset of taps being associated with a first subset of the plurality of layer and beam bases and determine a corresponding second subset of taps of the first subset of taps for each of the first subset of layer and beam bases; and a transmitter configured to transmit information indicative of the first subset of taps and information indicative of each of the second subset of taps, comprising at least a location of the first subset of taps and the second subset of taps, to the second wireless communications device.

30. A non-transitory computer readable medium having instructions stored thereon for:

receiving one or more signals from a second wireless communications device over a plurality of layer and beam bases, wherein each of the plurality of bases is associated with a layer and a beam used for communications between the first wireless communications device and the second wireless communications device;

determining a first subset of a plurality of taps based on a time domain representation of the one or more signals, each of the taps corresponding to a different time, the first subset of taps being associated with a first subset of the plurality of layer and beam bases;

determining a corresponding second subset of taps of the first subset of taps for each of the first subset of layer and beam bases; and transmitting information indicative of the first subset of taps and information indicative of each of the second subset of taps, comprising at least a location of the first subset of taps and the second subset of taps, to the second wireless communications device.

* * * * *